M. M. McINTYRE.
VEHICLE SPRING.
APPLICATION FILED MAY 2, 1906.

991,000.

Patented May 2, 1911.

2 SHEETS—SHEET 1.

Witnesses:
A. L. Lord.
Brennan & West

Inventor,
Michael M. McIntyre
By Bates, Fouts & Hull,
Attorneys

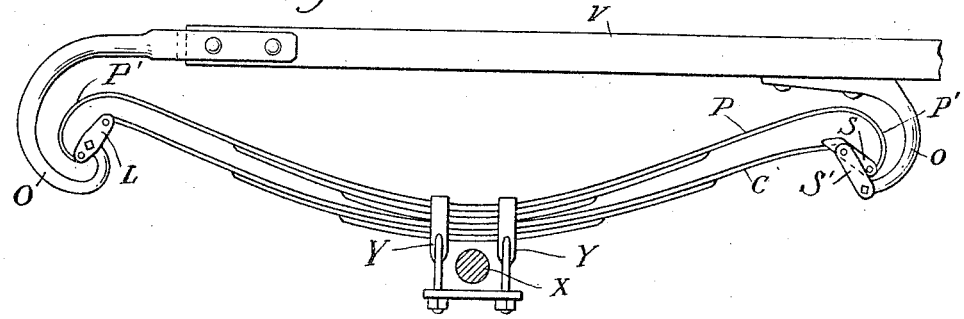
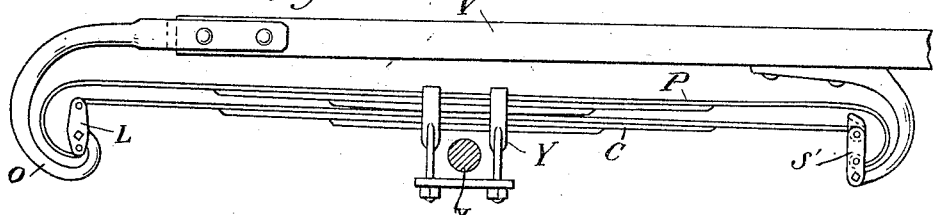
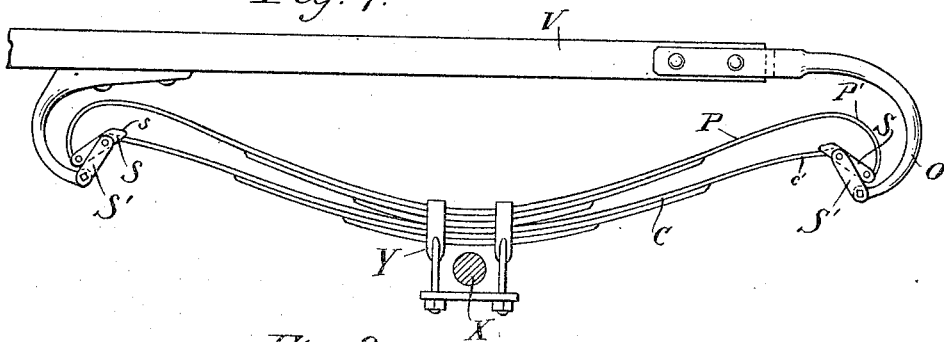
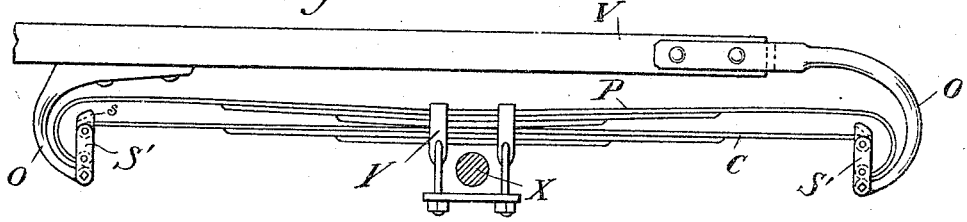

UNITED STATES PATENT OFFICE.

MICHAEL M. McINTYRE, OF CLEVELAND, OHIO, ASSIGNOR TO THE PERFECTION SPRING COMPANY, OF CLEVELAND, OHIO, A CORPORATION OF OHIO.

VEHICLE-SPRING.

991,000.  Specification of Letters Patent.  Patented May 2, 1911.

Application filed May 2, 1906. Serial No. 314,805.

*To all whom it may concern:*

Be it known that I, MICHAEL M. McINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

My invention relates to vehicle springs, and has for its main object to provide a construction of spring which will secure ease of riding, by supporting the load upon easily yielding spring members, and at the same time furnish sufficient strength to carry the load without destroying the physical properties of the spring.

A further object of the invention is to provide a construction in which the normal or unloaded weight of the vehicle is sustained mainly by one spring member and wherein another spring member is combined therewith to reinforce the former to a comparatively slight extent when the vehicle is unloaded, and to a greater extent when it is loaded, as by passengers or otherwise, or when running over rough roads, obstructions and the like. The former spring member I will hereinafter designate as the "carrier" spring and the latter as the "passenger" spring, since the former mainly carries the vehicle, and the latter assists mainly in carrying the passengers or load.

The invention further includes improved means to permit only vertical vibrations of the front axle of any ordinary vehicle and the rear axle of a shaft-driven automobile, by means of a peculiar connection between the ends of my spring members and the supports for the same; the invention also includes a peculiar connection between the ends of the springs and their support whereby, in the case of chain-driven automobiles (where a rod extends from the frame to the rear axle to keep the chain taut when the body vibrates) the rear axle may move horizontally as well as vertically without injury to the springs.

A further object of the invention is to provide an improved form of connection between the springs on opposite sides of a vehicle whereby the load, shocks, and vibrations to which the vehicle is subjected may be equalized between such springs.

Figure 1:
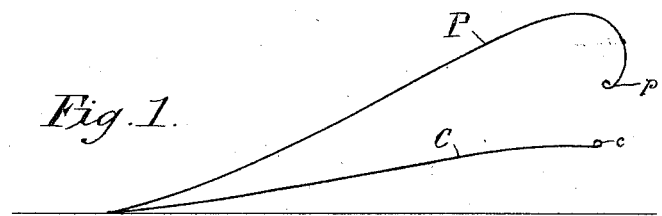
Figure 2:
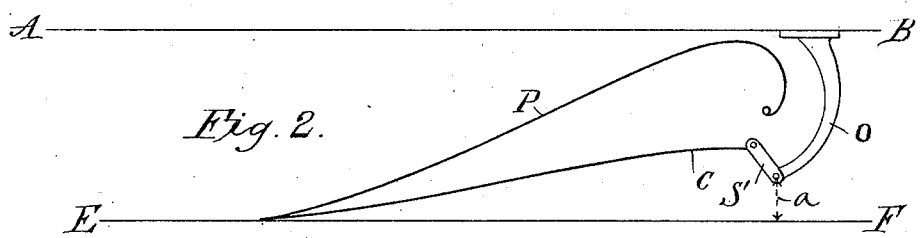
Figure 3:
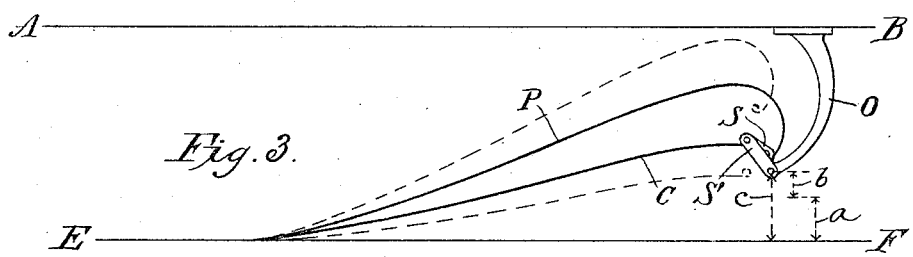
Figure 4:
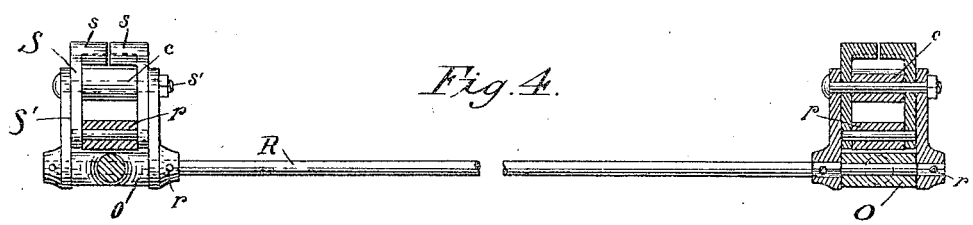

In the accompanying drawings, Figure 1 represents a diagrammatic view showing the relative positions of the spring members before the same are connected to a vehicle; Figs. 2 and 3 are similar views illustrating the relative positions of the spring members and vehicle body with respect to a base or normal line. Fig. 4 is a view, partly in elevation and partly in section, illustrating the construction by which weights, shocks and vibrations sustained by the springs on one side of the vehicle may be transmitted to those on the other side thereof. Fig. 5 is a side elevation of a spring constructed in accordance with my invention, showing the same with the vehicle unloaded. Fig. 6 represents a similar view showing the springs deflected to their extreme capacity. Figs. 7 and 8 are views, similar to views 5 and 6 respectively, of modified forms of the springs shown in the former figures.

Referring to the diagrammatic views, C and P represent respectively the carrier and passenger spring members, said members being shown in Fig. 1 in about the positions which they occupy before being attached to the vehicle. It will be observed that the spring P is of greater normal curvature than spring C; that is to say, the curvature or arch of the spring P is greater than that of spring C when neither of these springs is connected to a vehicle or subjected to any other action tending to alter the curvature given thereto in the process of spring making. In Fig. 2, the carrier spring C is shown as attached to the outrider O and the spring P is still unattached. In this view, A B represents the bottom of the vehicle frame, and E F represents any convenient base line, as the top of the axle of the vehicle. The line $a$ represents the distance between the lower end of the outrider O and the base line E F. In Fig. 3 the end of the spring P has been brought down and attached to the vehicle and has elevated the body of the vehicle and the outrider the distance $b$, which is the difference between the length of the line $a$, indicating the former height of the outrider above the base line E F and the line $c$, indicating the present distance of the lower end of the outrider from the line E F. The carrier spring member has been elevated the distance $b$ and the load is carried on the ends of the carrier and passenger spring members, and the spring member ends, for the distance $b$, form a particularly tender support for the vehicle and its load, and the vibrations of the vehicle body within the distance $b$ are practically negligible, since all the vibrations are made between the axle and the springs without moving the vehicle body. This is true no matter what may be the weight of the vehicle body, provided only that the springs are proportioned to such weight.

The principles above set forth are applied in the practical embodiments shown in the other figures. Referring to Fig. 5, C indicates the carrier spring, and P the passenger or load spring, X the axle to which the spring members are clamped by clips Y, and O the outriders or arms by which the spring members are connected to the frame of the vehicle, indicated at V. The spring members are leaf half springs, the upper terminating in long flexible ends P' formed into scrolls. The end of each scroll terminates in an eye $p$ which is normally carried beyond the eye $c$ on the end of the carrier spring and said eyes are connected by means of a short shackle S, the details of which will be described hereinafter.

A long shackle S' connects the eye of the carrier spring with the outrider O. Both ends of the spring members may be connected by the shackles S, as shown in Figs. 7 and 8, or only one end of each of said members may be thus connected, the other ends being connected to a lever L, the upper end of which is connected to the end of the carrier spring member, the lower end of which is connected to the end of the passenger spring member, said lever being pivoted intermediate of the ends thereof to the outrider, with the pivotal point nearer the point of connection of the passenger spring member therewith than is the point of connection of the carrier spring member therewith. The lever connection L is advantageous for connecting the front ends of the front spring members of a vehicle to an outrider and for connecting the front ends of the rear spring members of a shaft-driven automobile to an outrider, as the manner of pivoting the lever and of connecting the spring members thereto prevents any material horizontal movement of the axle when an obstruction is encountered by the wheel but permits free and easy vertical movement of the axle. The employment of the connection shown in Figs. 7 and 8 is particularly useful on the rear axles of vehicles having a chain drive, wherein one or more radius rods are employed to prevent rotation of the rear axle and to keep the chain taut during the vibrations of the body. The radius rods, while preventing the rotation of the rear axle cause the same to be moved bodily rearwardly and forwardly during the vibrations of the body with the result that, without the provision of some means such as shown in Figs. 7 and 8 for permitting the springs to move bodily and freely with said axle, the ends of the scroll spring member will be subjected to strains which will soon cause the breakage thereof. The provision of the shackles S and S' permits both spring members to move back and forth with the axle without affecting the ends thereof.

The form of connection which I prefer to use for both ends of the springs where a radius rod is employed is illustrated in detail in Fig. 4, wherein S' denotes the long or outer shackle, the lower ends of which are supported from the outrider O by means of a rod R extending therethrough and through said shackle ends. The upper ends of the shackle S' have attached thereto the eye $c$ of the carrier spring. The small shackle S by means of which the passenger spring is attached to the carrier spring and vehicle is preferably pivoted to the pin $s'$, said pin extending through the upper ends of the shackle S' and through the eye $c$. This shackle S is sufficiently shorter than the shackle S' to enable the lower ends thereof, with the attached eye $p$, to swing clear of the lower end of the outrider O. To prevent the shackle S from capsizing on rebound of the vehicle after striking an obstacle or when there is any tendency to separate the axle and body of the vehicle, the ends of the spring member P will be held down against such separation. An effective means of securing this result is by extending the upper ends of the side links of the shackle S beyond the upper ends of the shackle S' and the eye $c$ and by providing the upper end of each side link with an inwardly projecting boss $s$. These bosses project inwardly, as indicated in Figs. 5 to 8, that is toward the center of the springs, and will engage the upper leaf $c'$ of the carrier spring C, thereby preventing the shackle S from capsizing when the ends P' of the passenger spring member are brought down and connected thereto, and permitting the spring P to exercise its lifting effect on the vehicle body and at the same time be held in the most efficient position for responding to additional weight, shocks, or vibrations which may be transmitted thereto.

As will appear from Figs. 5 and 7, when the vehicle is unloaded, the lower end of the shackle S is outside of a line extending vertically from the eye in the end of the outrider. Under extreme load, the parts reach the positions shown in Figs. 6 and 8, that is to say, the lower spring C straightens and lengthens, forcing the top of the shackle S' outwardly. As the upper spring P straightens, the eye on the end of the scroll moves inwardly, causing the little shackle S to swing inwardly, as shown in Figs. 6 and 8. The proportions of parts should be such that, under full deflection, the lower end of the little shackle S should not extend inwardly beyond a line joining the eye of the large shackle with the eye of the outrider, the three eyes being in a substantially vertical line. This arrangement of parts secures the best coöperation between the spring members, the scroll spring thus relieving the semi-elliptic spring proportionally to the load carried or the stock sustained.

In the case of the left hand or front ends of the springs in Figs. 5 and 6, the relative positions of the ends of the spring members C and P, both with reference to each other and to the outrider, at and before deflection, are the same as is the case with the right hand or rear ends of said spring members. Before deflection, the lower end of the scroll P' is outside of the eye of the outrider, and under extreme load it is substantially in a vertical line extending through the eye of the spring C and the eye of the outrider.

With the springs bent and proportioned as shown herein it will be apparent that, when the end of spring member P is brought down and connected to shackle S, the corresponding end of spring member C being disconnected from shackle S', the two spring members will be under reverse tension, the end of spring member C being lifted above normal position by spring member P and the end of spring member P being depressed below normal position by spring member C. When connected to the unloaded vehicle frame, said members are no longer under reverse tension, as the ends of both are depressed by the weight of the frame.

By the construction herein shown and described, the vehicle is carried from the ends of flexible spring members whose lengths are such and whose strength is so proportioned to the load which they bear as to produce a slow, easy movement of the vehicle body under shocks, while the manner of connecting the same to the body permits them to respond to shocks and vibrations without subjecting the tender ends of the springs to undue stress and without transmitting the shocks or excessive vibrations of the axle to the vehicle body.

With both forms of springs I employ equalizing rods, shown in detail in Fig. 4. In this figure, the equalizing rod R is shown as applied to the shackle construction, although, as indicated in Figs. 5 and 6, it is also applied to the levers L. The lower ends of the shackles S' are pinned or otherwise rigidly connected to the rod R, as indicated at r whereby any movement of the upper end of the shackle S' will rotate said rod. This rod is connected to a corresponding outrider and shackle on the opposite side of the vehicle. Similar rods may be connected in a similar manner to the opposite ends of the same spring members, four such rods being usually employed with the two sets of springs usually found on vehicles. It will be evident that these rods will serve to transmit the load from one side of the vehicle to the other and, by their connection with the pivots of the shackles S' or levers L will transmit shocks from a spring on one side of the vehicle to a spring on the other side of the vehicle, thereby distributing the strains between two sets of springs instead of leaving those on one side to receive and resist the same alone. At the same time they prevent in a large measure side deflection of the vehicle body.

By the construction herein described, both spring members automatically and at all times support their relative proportions of the vehicle both with and without load. While I have shown the lower spring member as the one which carries the major portion of the vehicle, the spring members may be reversed in position.

While I have necessarily described my invention in detail, it will be obvious that such details may be modified or departed from more or less without avoiding the spirit of my invention. I therefore do not propose to be limited to such details except as the same may be included in the claims hereto annexed.

I claim:

1. The combination, with a vehicle frame and axle, of a spring comprising an upper and a lower spring member connected together at their body portions and to said axle and having their ends connected to the vehicle frame, one of said spring members being of less strength and of greater normal curvature than the other whereby, when said members are connected to the vehicle frame, the weaker member is under greater deflection but sustains a relatively small proportion of the weight of the unloaded vehicle, and the other member being of greater strength and being so shaped and proportioned as to sustain the greater proportion of the weight of the unloaded vehicle, substantially as specified.

2. The combination, with a vehicle frame and axle, of a pair of vehicle spring members connected together at their body portions and to the axle, one of said spring members being of less strength than the other and having a long flexible scroll end flexibly connected to the end of the other member and both of said members having their ends connected to the vehicle frame, both of said members sustaining jointly the weight of the unloaded vehicle, the said members being so shaped and proportioned that the member having the scroll end is of greater normal curvature, sustains a smaller proportion of the weight of the unloaded vehicle, and is under greater deflection than the other member, substantially as specified.

3. A compound spring for vehicles comprising an upper and a lower leaf spring member connected together at their body portions, one of said members having a scroll end extending partly around the corresponding end of the other member, the member having the scroll end being relatively weaker than the other member and said members being so shaped and proportioned that, when connected to the unloaded vehicle, the member having the scroll end is under greater deflection and sustains a relatively smaller proportion of the weight of the unloaded vehicle than the other member while the latter member is under less deflection and sustains a greater proportion of the weight of the unloaded vehicle than the former member, substantially as specified.

4. The combination, with the frame and axle of a vehicle, of a compound spring clamped to said axle, said spring comprising a pair of spring members the upper whereof has a scroll end extending around the adjacent end of the lower member, a flexible connection between said ends permitting free movement of the scroll end inwardly, or toward the center of the spring, but limiting the movement of the same outwardly, a connection between the end of the lower spring member and the vehicle, and means for connecting the other ends of the spring members to the vehicle, said spring members being so shaped and proportioned that, when connected to the unloaded vehicle, the upper member sustains a relatively small proportion of the weight of such vehicle and is under less tension than the lower spring member, substantially as specified.

5. The combination with the body of a vehicle, of a spring comprising two leaf spring members clamped together at their body portions, and a lever pivotally supported intermediate of its ends from the vehicle, an end of one of said spring members being connected to one end of said lever and an end of the other of said members being connected to the other end of said lever, substantially as specified.

6. The combination, with the axle and outrider of a vehicle, of a spring comprising two leaf spring members clamped together about the middle and to the vehicle axle, and a lever pivoted intermediate of its ends to the vehicle outrider, an end of one of said spring members being connected to one end of said lever and an end of the other of said members being connected to the other end of said lever, substantially as specified.

7. The combination, with an axle and an outrider of a vehicle, of a spring comprising two leaf spring members clamped together and to said axle, one of said spring members having a scroll end extending below an end of the other member, a lever pivoted intermediate of its ends to said outrider and having its lower end connected to the end of the scroll and its upper end connected to the end of the other spring member, substantially as specified.

8. The combination, with an axle and an outrider of a vehicle, of a spring comprising two leaf spring members clamped together and to said axle, the upper spring member having a scroll end extending below an end of the lower member, and a lever pivoted intermediate of its ends to said outrider and having its upper end connected to the end of the lower spring member and its lower end connected to the end of the upper spring member, substantially as specified.

9. The combination, with an axle and an outrider of a vehicle, of a spring comprising a pair of leaf spring members connected together and to said axle, one of said members having a scroll end projecting below the end of the other member, and a lever pivoted intermediate its ends to said outrider and having its upper portion connected to the end of one of said spring members and its lower portion connected to the end of the other spring member, the distance between the fulcrum of said lever and the end of the upper spring member being less than the distance between said fulcrum and the end of the lower spring member, substantially as specified.

10. The combination, with an axle and an outrider of a vehicle, of a spring comprising a pair of leaf spring members connected together and to said axle, the upper of said members having a scroll end projecting below the end of the lower member, and a lever pivoted intermediate its ends to said outrider and having its upper portion connected to the end of the lower spring member and its lower portion connected to the end of the upper spring member, the distance between the fulcrum of said lever and the end of the upper spring member being less than the distance between said fulcrum and the end of the lower spring member, substantially as specified.

11. The combination, with the axle and frame of a vehicle, of a pair of spring members connected to said axle, and means for flexibly connecting adjacent ends of said members together and to the frame, said means permitting the free movement of both of said ends inwardly but limiting the outward movement of one of said ends, substantially as specified.

12. The combination, with the frame and axle of a vehicle, of a spring comprising a pair of spring members connected to said axle, one of said members having a scroll end, and means for flexibly connecting the ends of said members to the frame, said means permitting the free movement of the ends of both members inwardly but limiting the outward movement of the member having the scroll end, substantially as specified.

13. The combination, with an axle and outrider of a vehicle, of a spring comprising two leaf spring members connected together and to said axle, one of said members terminating in a scroll extending beyond and below the end of the other spring member, means for flexibly connecting the ends of said members to the outrider, and means for maintaining the ends of said spring members substantially the same relative distance from the end of the outrider, substantially as specified.

14. The combination, with an axle and outrider of a vehicle, of a pair of leaf spring members connected together and to said axle, one of said members having a scroll end extending beyond and below the end of the other member, a swinging connection between the end of each spring member and the outrider, and means for limiting the movement of the end of the scroll, substantially as specified.

15. The combination with the frame and axle of a vehicle, of a pair of leaf spring members connected to said axle, one of said members having a scroll end extending partly around the end of the other member, and means for flexibly connecting adjacent ends of said members together and to the frame, said means permitting the free inward movement of the scroll end, but limiting the outward movement thereof, substantially as specified.

16. The combination, with an axle and outrider of a vehicle, of a pair of leaf spring members connected to said axle, one of said members having a scroll end extending beyond and below the end of the other, a link or shackle connecting the end of the latter spring member to the outrider, and a link or shackle connecting the end of the scroll with the former link or shackle, means being provided for limiting the rotation of the latter link or shackle in one direction, substantially as specified.

17. The combination, with an axle and outrider of a vehicle, of a pair of leaf spring members connected to said axle, one of said members having a scroll end extending beyond and below the end of the other, a link or shackle connecting the end of the latter spring member to the outrider, and a link or shackle connecting the end of the scroll with the former link or shackle, the latter link or shackle being provided with means for engaging the end portion of the other spring to limit rotation of the latter link or shackle, substantially as specified.

18. The combination, with an axle and an outrider of a vehicle, of a spring comprising an upper and a lower spring member connected together and to said axle, the upper spring member having a scroll end extending around the end of the lower member and below the same, a link or shackle connecting the end of the lower member to the outrider, a link or shackle connecting the end of the upper member with the former link or shackle, said members being so proportioned that the end of the upper spring member is normally outside of a line connecting the pivotal points of the former link or shackle, and means for preventing the end of the upper spring member from passing above the end of the lower spring member, substantially as specified.

19. The combination, with an axle and an outrider of a vehicle, of a spring comprising an upper and a lower spring member connected together and to said axle, the upper spring member having a scroll end extending around the end of the lower member and below the same, a link or shackle connecting the end of the lower member to the outrider, a link or shackle connecting the end of the upper member with the former link or shackle, and means for preventing the end of the upper spring member from passing above the end of the lower spring member, substantially as specified.

20. The combination, with an axle and an outrider of a vehicle, of a spring comprising an upper and a lower spring member connected together and to said axle, the upper spring member having a scroll end extending beyond and below the end of the upper spring member, a link or shackle connecting the end of the lower spring member with the outrider, and a link or shackle connecting the end of the upper spring member with the upper portion of the former link or shackle, the latter link or shackle having a boss adapted to engage the end portion of the lower spring member to prevent rotation of said shackle beyond a pre-determined degree in one direction, substantially as specified.

21. The combination, with a pair of springs located on opposite sides of a vehicle body, each of said springs comprising two members one of which terminates in a scroll, an outrider at each side of said vehicle, a rod extending across said vehicle and pivoted in said outriders, and a lever rigidly secured intermediate of its ends to said rod adjacent each outrider, the opposite ends of said lever being connected with the ends of the spring members, substantially as specified.

22. The combination, with a pair of springs located on opposite sides of a vehicle body, an outrider on each side of said body, a spring on each side of said vehicle, each spring comprising a pair of members connected together and to the axle, a rod extending across said vehicle and pivotally supported by said outriders, a link or shackle rigid with said rod on each side of said vehicle and having its other end connected with one of said spring members, and a flexible connection between the ends of each pair of spring members, substantially as specified.

23. The combination, with a pair of springs located on opposite sides of a vehicle body, each spring comprising a pair of spring members connected together and to the axle, one of said members having a scroll end extending beyond and below the end of the other spring member, a flexible connection between the ends of each pair of spring members, an outrider on each side of said vehicle, a rod extending across said vehicle and pivotally supported by said outriders, and a link or shackle adjacent each outrider having one end pivotally secured to the other spring member and the other end rigidly connected to the rod, substantially as specified.

24. The combination, with a vehicle body, of a spring comprising a pair of superposed spring members, one of which terminates in a scroll end partly surrounding the end of the other, and links connecting said ends with the vehicle and arranged to prevent the end of the scroll from passing beyond the end of the other member to the reverse side thereof, substantially as specified.

25. The combination, with a vehicle body and axle, of a pair of spring members connected together at their body portions and to said axle, the upper spring member having a scroll end extending around the adjacent end of the lower spring member, means for flexibly connecting said ends, said means permitting free movement of the scroll end in one direction but limiting the movement of said end in another direction, and means for connecting the ends of the spring to the vehicle body, substantially as specified.

26. The combination, with a pair of springs located on opposite sides of a vehicle body and each comprising two members, of a support carried by said vehicle, a rod carried by said support and extending across said vehicle, a lever rigidly secured intermediate of its ends to said rod adjacent to each side of the vehicle body, the opposite ends of said lever being connected with the ends of the spring members, substantially as specified.

27. The combination, with a vehicle frame and axle, of a spring comprising an upper and a lower spring member connected together at their body portions and to the axle, the upper spring member having a flexible scroll end extending beyond the corresponding end of the lower spring member, and a lever connected to the adjacent ends of the spring members and supported by said frame at a point intermediate of the points of connection of the said spring ends therewith, substantially as specified.

In testimony whereof, I hereunto affix my signature in the presence of two witnesses.

MICHAEL M. McINTYRE.

Witnesses:
 ALBERT H. BATES,
 FRANKLIN E. TERRILL.